United States Patent
Surlaker et al.

(10) Patent No.: US 8,397,244 B2
(45) Date of Patent: Mar. 12, 2013

(54) PUBLISHER FLOW CONTROL AND BOUNDED GUARANTEED DELIVERY FOR MESSAGE QUEUES

(75) Inventors: Kapil Surlaker, Mountain View, CA (US); Neerja Bhatt, Mountain View, CA (US); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 258 days.

(21) Appl. No.: 12/835,726

(22) Filed: Jul. 13, 2010

(65) Prior Publication Data

US 2010/0281491 A1    Nov. 4, 2010

Related U.S. Application Data

(62) Division of application No. 11/192,869, filed on Jul. 29, 2005, now Pat. No. 7,779,418.

(60) Provisional application No. 60/640,555, filed on Dec. 30, 2004.

(51) Int. Cl.
    *G06F 9/44* (2006.01)
(52) U.S. Cl. ........................................... 719/314
(58) Field of Classification Search .................. 719/310, 719/313, 314
    See application file for complete search history.

(56) References Cited

U.S. PATENT DOCUMENTS

| | | |
|---|---|---|
| 4,318,182 A | 3/1982 | Bachman et al. |
| 5,113,522 A | 5/1992 | Dinwiddie et al. |
| 5,151,987 A | 9/1992 | Abraham et al. |
| 5,222,217 A | 6/1993 | Blount et al. |
| 5,347,632 A | 9/1994 | Filepp et al. |
| 5,357,612 A | 10/1994 | Alaiwan |
| 5,465,328 A | 11/1995 | Dievendorff et al. |
| 5,627,764 A | 5/1997 | Schutzman et al. |
| 5,649,102 A | 7/1997 | Yamauchi et al. |
| 5,721,825 A | 2/1998 | Lawson et al. |
| 5,790,807 A | 8/1998 | Fishler et al. |
| 5,802,253 A | 9/1998 | Gross et al. |
| 5,828,835 A | 10/1998 | Isfeld et al. |
| 5,841,973 A | 11/1998 | Kessler et al. |
| 5,867,665 A | 2/1999 | Butman et al. |
| 5,867,667 A | 2/1999 | Butman et al. |
| 5,870,562 A | 2/1999 | Butman et al. |
| 5,878,056 A | 3/1999 | Black et al. |

(Continued)

FOREIGN PATENT DOCUMENTS

| | | |
|---|---|---|
| EP | 0 750 256 A2 | 6/1996 |
| EP | 0 942 363 A2 | 9/1999 |

(Continued)

OTHER PUBLICATIONS

Microsoft Message Queuing Services: A Guide to Reviewing Microsoft Message Queuing Server Release 1.0, 1997 Microsoft Corporation.

(Continued)

*Primary Examiner* — Van Nguyen
(74) *Attorney, Agent, or Firm* — Hickman Palermo Truong Becker Bingham Wong LLP

(57) ABSTRACT

Techniques for managing messages in computer systems are provided. In one embodiment, in response to a publisher attempting to enqueue a message in a queue, a determination is made whether a condition is satisfied. The condition is based on the current usage of the queue by the publisher. Based on whether the condition is satisfied, a decision is made whether to enqueue the message in the queue. The decision whether to enqueue the message may comprise restricting the publisher from enqueueing any more messages in the queue until the same or a different condition is satisfied.

30 Claims, 5 Drawing Sheets

U.S. PATENT DOCUMENTS

| | | | |
|---|---|---|---|
| 5,884,035 | A | 3/1999 | Butman et al. |
| 5,890,167 | A | 3/1999 | Bridge, Jr. et al. |
| 5,933,604 | A | 8/1999 | Inakoshi |
| 5,940,839 | A | 8/1999 | Chen et al. |
| 5,951,694 | A | 9/1999 | Choquier et al. |
| 6,029,205 | A | 2/2000 | Alferness et al. |
| 6,041,357 | A | 3/2000 | Kunzelman et al. |
| 6,058,389 | A | 5/2000 | Chandra et al. |
| 6,088,728 | A | 7/2000 | Bellemore et al. |
| 6,182,086 | B1 | 1/2001 | Lomet et al. |
| 6,182,252 | B1 | 1/2001 | Wong et al. |
| 6,188,699 | B1 | 2/2001 | Lang et al. |
| 6,243,751 | B1 | 6/2001 | Chatterjee et al. |
| 6,295,541 | B1 | 9/2001 | Bodnar et al. |
| 6,330,686 | B1 | 12/2001 | Denny et al. |
| 6,334,114 | B1 | 12/2001 | Jacobs et al. |
| 6,338,074 | B1 | 1/2002 | Poindexter et al. |
| 6,393,423 | B1 | 5/2002 | Goedken |
| 6,434,605 | B1 | 8/2002 | Faulkner et al. |
| 6,442,568 | B1 | 8/2002 | Velasco et al. |
| 6,446,204 | B1 | 9/2002 | Pang et al. |
| 6,473,794 | B1 | 10/2002 | Guheen et al. |
| 6,493,826 | B1 | 12/2002 | Schofield et al. |
| 6,515,968 | B1 | 2/2003 | Combar et al. |
| 6,519,571 | B1 | 2/2003 | Guheen et al. |
| 6,529,932 | B1 | 3/2003 | Dadiomov et al. |
| 6,536,037 | B1 | 3/2003 | Guheen et al. |
| 6,560,237 | B1 | 5/2003 | Hiscock et al. |
| 6,614,900 | B1 | 9/2003 | Champoux |
| 6,654,907 | B2 | 11/2003 | Stanfill et al. |
| 6,658,596 | B1 | 12/2003 | Owen |
| 6,691,155 | B2 | 2/2004 | Gottfried |
| 6,704,831 | B1 | 3/2004 | Avery |
| 6,826,182 | B1 | 11/2004 | Parthasarathy |
| 6,892,210 | B1 | 5/2005 | Erickson et al. |
| 7,058,957 | B1 | 6/2006 | Nguyen |
| 7,149,212 | B2 | 12/2006 | Calvignac et al. |
| 7,185,033 | B2 | 2/2007 | Jain et al. |
| 7,185,034 | B2 | 2/2007 | Jain et al. |
| 7,203,706 | B2 | 4/2007 | Jain et al. |
| 7,266,764 | B1 | 9/2007 | Flam |
| 7,546,613 | B2 | 6/2009 | Ikeda et al. |
| 7,571,241 | B1 | 8/2009 | Nalawade |
| 7,584,472 | B1 | 9/2009 | McCormick et al. |
| 2001/0032137 | A1 | 10/2001 | Bennett et al. |
| 2001/0047270 | A1 | 11/2001 | Gusick et al. |
| 2001/0052137 | A1 | 12/2001 | Klein |
| 2002/0049845 | A1 | 4/2002 | Sreenivasan et al. |
| 2002/0073019 | A1 | 6/2002 | Deaton |
| 2002/0073139 | A1 | 6/2002 | Hawkins et al. |
| 2002/0112008 | A1 | 8/2002 | Christenson et al. |
| 2002/0116457 | A1 | 8/2002 | Eshleman et al. |
| 2002/0138582 | A1 | 9/2002 | Chandra et al. |
| 2002/0144010 | A1 | 10/2002 | Younis et al. |
| 2002/0161896 | A1 | 10/2002 | Wen et al. |
| 2002/0194081 | A1 | 12/2002 | Perkowski |
| 2003/0037146 | A1 | 2/2003 | O'Neill |
| 2003/0039212 | A1 | 2/2003 | Lloyd et al. |
| 2003/0093471 | A1 | 5/2003 | Upton |
| 2003/0110085 | A1 | 6/2003 | Murren et al. |
| 2003/0135609 | A1 | 7/2003 | Carlson et al. |
| 2003/0135642 | A1 | 7/2003 | Benedetto et al. |
| 2003/0212657 | A1 | 11/2003 | Kaluskar et al. |
| 2003/0212670 | A1 | 11/2003 | Yalamanchi et al. |
| 2003/0236834 | A1 | 12/2003 | Gottfried |
| 2004/0024771 | A1 | 2/2004 | Jain et al. |
| 2004/0024774 | A1 | 2/2004 | Jain et al. |
| 2004/0024794 | A1 | 2/2004 | Jain et al. |
| 2004/0034640 | A1 | 2/2004 | Jain et al. |
| 2004/0034664 | A1 | 2/2004 | Jain et al. |
| 2004/0064548 | A1 | 4/2004 | Adams et al. |
| 2004/0103195 | A1 | 5/2004 | Chalasani et al. |
| 2004/0107125 | A1 | 6/2004 | Guleen et al. |
| 2004/0235523 | A1 | 11/2004 | Schrire et al. |
| 2005/0021622 | A1 | 1/2005 | Cullen |
| 2005/0262205 | A1 | 11/2005 | Nikolov et al. |

FOREIGN PATENT DOCUMENTS

| | | |
|---|---|---|
| EP | 0 992 909 A2 | 4/2000 |
| EP | 1 170 662 A2 | 1/2002 |
| EP | 1 260 902 A2 | 5/2002 |
| WO | WO 0010084 A | 2/2000 |
| WO | WO 02/05116 A2 | 1/2002 |
| WO | WO 02/097676 A2 | 12/2002 |
| WO | WO 03/014928 A2 | 2/2003 |
| WO | WO 03/014929 A | 2/2003 |
| WO | WO 03/062983 A2 | 7/2003 |

OTHER PUBLICATIONS

Chase, J. et al., "Dynamic Virtual Clusters in a Grid Site Manager," Proceedings of the 12$^{th}$ IEEE International Symposium on High Performance Distributed Computing (HPDC'03), 2003, IEEE, pp. 90-100.

Gunter, O. et al., "MMM: A Web-Based System for Sharing Statistical Computing Modules," IEEE, May-Jun. 1997, vol. 1, Issue 3, pp. 59-68.

Kokku, R. et al., "Half-pipe Anchoring: An Efficient Technique for Multiple Connection Handoff," Proceedings 10$^{th}$ International Conference on Network Protocols, Nov. 12, 2002, XP010632563, 10 pages.

Kurakawa, K. et al, "Life Cycle Design Support Based on Environmental Information Sharing," IEEE, Feb. 1-3, 1999, Proceedings EcoDesign '99, First International Symposium, pp. 138-142.

Lin, Y. et al., "Direct Web Switch Routing with State Migration, TCP Masquerade, and Cookie Name Rewriting," Globecom 2003, IEEE Global Telecommunications Conference, Dec. 1, 2003, IEEE, CP010677300, pp. 3663-3667.

Skow, E. et al., "A Security Architecture for Application Session Handoff," 2002, IEEE International Conference Proceedings, Apr. 28-May 2, 2002, vol. 1 of 5, pp. 2058-2063, XP010589848.

Song, H. et al., "Browser State Repository Service," Lecture Notes in Computer Science, vol. 2414, 2002, pp. 1-14, XP002904339.

International Searching Authority, "Notification of Transmittal of the International Search Report and the Written Opinion of the International Searching Authority, or the Declaration," PCT/US2004/026570, Nov. 12, 2004, 13 pages.

European Patent Office, International Preliminary Report on Patentability, Aug. 26, 2005, International Application No. PCT/US2004/026570, 9 pages.

Current Claims of International Application No. PCT/US2004/026570, 4 pages.

International Searching Authority, "Notification of Transmittal of the International Search Report and the Written Opinion of the International Searching Authority, or the Declaration," PCT/US2004/026389, Aug. 4, 2005, 13 pages.

Current Claims for International Application No. PCT/US2004/026389, pp. 1-7.

International Searching Authority, "Notification of Transmittal of the International Search Report and the Written Opinion of the International Searching Authority, or the Declaration," PCT/US2004/025805, dated Dec. 3, 2004, 12 pages.

Current Claims of International Application No. PCT/US2004/025805, 8 pages.

International Preliminary Examining Authority, "Written Opinion of the International Preliminary Examining Authority," PCT/US2004/025805, Jun. 7, 2005, 4 pages.

International Searching Authority, "Notification of Transmittal of the International Search Report or the Declaration," PCT/US03/23747, dated May 25, 2004, 6 pages.

Current Claims in PCT application, International Application No. PCT/US03/23747, 14 pages.

International Searching Authority, "Notification of the Transmittal of the International Search Report and Written Opinion of the International Searching Authority, or the Declaration," PCT/US2005/025887, dated Feb. 6, 2006, 12 pages.

Current Claims, PCT/US2005/025887, 3 pages.

PUBLISHER FLOW CONTROL AND BOUNDED GUARANTEED DELIVERY FOR MESSAGE QUEUES

PRIORITY CLAIM; CROSS-REFERENCE TO RELATED APPLICATIONS

This application claims the benefit and priority under 35 U.S.C. §120 as a Divisional of U.S. patent application Ser. No. 11/192,869, which is entitled "PUBLISHER FLOW CONTROL AND BOUNDED GUARANTEED DELIVERY FOR MESSAGE QUEUES" and which was filed by Kapil Surlaker et al. on Jul. 29, 2005 (now U.S. Pat. No. 7,779,418), the entire contents of which is hereby incorporated by reference as if fully set forth herein, and which claims priority under 35 U.S.C. .sctn.119(e) to U.S. Provisional Patent Application No. 60/640,555, entitled "MEMORY MANAGEMENT IN BUFFERED QUEUES", filed by Kapil Surlaker et al. on Dec. 30, 2004, the entire contents of which is hereby incorporated by reference for all purposes as if fully set forth herein. The applicants hereby rescind any disclaimer of claim scope in the parent application(s) or the prosecution history thereof and advise the USPTO that the claims in this application may be broader than any claim in the parent application(s).

This application is related to U.S. patent application Ser. No. 11/192,830, entitled "REPEATABLE MESSAGE STREAMS FOR MESSAGE QUEUES IN DISTRIBUTED SYSTEMS", filed by Kapil Surlaker et al. on Jul. 29, 2005 (now U.S. Pat. No. 7,818,386), the entire contents of which are herein incorporated by reference for all purposes as if originally set forth herein.

This application is related to U.S. patent application Ser. No. 10/443,206, entitled "BUFFERED MESSAGE QUEUE ARCHITECTURE FOR DATABASE MANAGEMENT SYSTEMS", filed by Namit Jain et al. on May 21, 2003 (now U.S. Pat. No. 7,181,482), the entire contents of which are herein incorporated by reference for all purposes as if originally set forth herein.

This application is related to U.S. patent application Ser. No. 10/443,175, entitled "BUFFERED MESSAGE QUEUE ARCHITECTURE FOR DATABASE MANAGEMENT SYSTEMS WITH UNLIMITED BUFFERED MESSAGE QUEUE WITH LIMITED SHARED MEMORY", filed by Namit Jain et al. on May 21, 2003 (now U.S. Pat. No. 7,185,033), the entire contents of which are herein incorporated by reference for all purposes as if originally set forth herein.

This application is related to U.S. patent application Ser. No. 10/443,323, entitled "BUFFERED MESSAGE QUEUE ARCHITECTURE FOR DATABASE MANAGEMENT SYSTEMS WITH GUARANTEED AT LEAST ONCE DELIVERY", filed by Namit Jain et al. on May 21, 2003 (now U.S. Pat. No. 7,185,034), the entire contents of which are herein incorporated by reference for all purposes as if originally set forth herein.

This application is related to U.S. patent application Ser. No. 10/443,207, entitled "BUFFERED MESSAGE QUEUE ARCHITECTURE FOR DATABASE MANAGEMENT SYSTEMS WITH MEMORY OPTIMIZATIONS AND 'ZERO COPY' BUFFERED MESSAGE QUEUE", filed by Namit Jain et al. on May 21, 2003 (now U.S. Pat. No. 7,203,706), the entire contents of which are herein incorporated by reference for all purposes as if originally set forth herein.

This application is related to U.S. patent application Ser. No. 10/443,174, entitled "BUFFERED MESSAGE QUEUE ARCHITECTURE FOR DATABASE MANAGEMENT SYSTEMS WITH TRANSACTIONAL ENQUEUE SUPPORT", filed by Namit Jain et al. on May 21, 2003, the entire contents of which are herein incorporated by reference for all purposes as if originally set forth herein.

FIELD OF THE INVENTION

The present invention relates to managing of information by computer systems. The invention relates more specifically to an approach for managing messages in message queues.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Messaging is a communication model that is used to handle the complexity of communications between multiple entities in one or more computer systems. In the context of computer systems, the term "message" may refer to any item that includes data of any data type or format. For example, a database application for a Database Management System (DBMS) may submit a request for data in the form of a message to a database server and the request is stored in a message queue of the DBMS. Furthermore, messages may be stored persistently, may be propagated between queues on different nodes of a distributed DBMS, and may be transmitted over a network.

As used herein, the terms "message queue" and "queue" refer to a message queue implemented in a volatile memory, such as a Random Access Memory (RAM). The volatile memory may be a shared volatile memory that is accessible by a plurality of processes. A message queue may also be used in conjunction with a storage space in non-volatile permanent store for storing messages from the queue, such as, for example, a database, a table in a database, a file system, or a file in a file system. Message queues used in conjunction with storage space in permanent store are typically used as a communication mechanism by information systems that require a high quality of messaging service, such as, for example, guaranteed delivery of messages even in the event of a information system crash or failure.

A "spill" process flushes messages from a message queue to a non-volatile permanent store, and is typically used to manage the amount of available space in the message queue. For example, the spill process addresses situations where a request is made to enqueue a new message into a message queue when the queue does not currently have sufficient available space to store the new message. In order to make room for the new message in the message queue, the spill process stores ("spills over") one or more messages from the queue to the permanent store. Only the message headers of the spilled messages remain in the message queue in order to maintain the place of the spilled messages in the queue. A message header typically contains data indicating that its associated message is stored in the permanent store, and may also specify the location in the permanent store where the message is stored. When a message header is processed, the message associated with the header is retrieved from the permanent store. According to some implementations of a spill process, spilled messages are stored in a permanent store that is organized as a queue. Further, the spill process is usually transparent to entities that use the message queue, and such entities are usually unaware of whether the messages they are interested in have been stored in the permanent store.

The message queues referred to herein support a publish-and-subscribe communication mechanism, where message producers and message consumers may be decoupled from and independent of each other. An entity that produces a message is referred to as a "publisher." An entity interested in messages in a message queue "subscribes" to the message queue and is referred to as a "subscriber" or a "consumer". The "publisher" and "consumer" entities may be any process, device, software application, daemon, thread, fiber, or any other mechanism that is allocated computing resources and is executing in one or more computer systems. When a publisher "publishes", or "enqueues", messages to a message queue, the messages become available to the consumers who may "consume", or "dequeue", the messages that they have subscribed for from the message queue. Usually, a message is removed, or deleted, from the queue only after every consumer to which the message is targeted has consumed the message. If a message has not yet been consumed by all of its intended consumers, the message typically stays in the queue.

In some implementations of message queues that are used in conjunction with a permanent store, messages published in a message queue are delivered to all eligible consumers at least once. In these implementations, consumers of messages in the message queue are guaranteed delivery even in the event of failures, so long as a publisher is "repeatable." A publisher is "repeatable" when it re-enqueues, in response to the occurrence of a particular event or a failure, all messages that (1) it published to the message queue before the event or failure and (2) have not yet been consumed by all consumers that have subscribed to these messages. The operation in which a publisher re-enqueues, after the occurrence of an event or a failure, messages that it previously has enqueued in the queue is referred to herein as a "replay" operation. An example of a repeatable publisher is an application, in a DBMS, that implements transactional replication, in which changes made to a database in one location must be replicated to one or more other databases in different locations.

In a system that has multiple publishers and multiple consumers, and in which messages may be transferred from some queues to other queues, the specific techniques used to manage messages in the system can have a significant impact on the performance in areas such as recoverability and memory usage. Therefore it is desirable to provide mechanisms for efficiently managing the publishers, the queues, the propagation of messages, and the resources involved in maintaining the queues.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
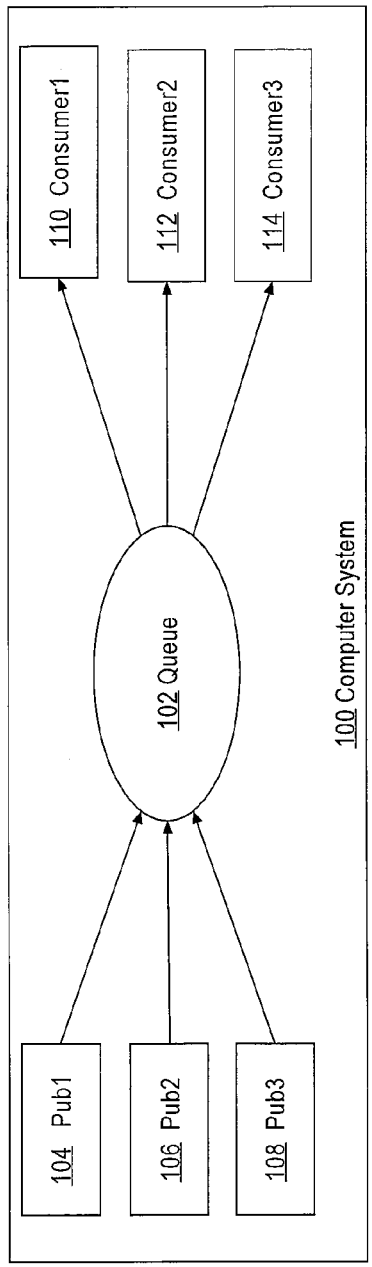
FIG. 1A is a block diagram that illustrates an operational context in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Functional Overview

Techniques are described for managing messages in computer systems. In one embodiment, in response to a publisher attempting to enqueue a message in a queue, a determination is made whether a condition is satisfied. The condition is based on the current usage of the queue by the publisher. For example, the determination may relate to whether that particular publisher has too many outstanding messages in the queue. Based on whether the condition is satisfied, it is decided whether to enqueue the message in the queue. For example, if the particular publisher has too many outstanding messages in the queue, then the publisher may be restricted from publishing any more messages in the queue until the same or a different condition is satisfied.

In one embodiment, the queue may be stored in volatile memory, and the publisher may be associated with one or more consumers that consume messages enqueued in the queue by the publisher. The publisher may also be a particular publisher of a plurality of publishers that share the queue.

In an embodiment, first one or more messages enqueued by a publisher in a queue are spilled over to permanent store if one or more conditions are satisfied. In response to spilling over the one or more messages, a parameter associated with the publisher is updated, where the parameter indicates a particular message enqueued by the publisher in the queue.

In one embodiment the publisher is repeatable. In response to the occurrence of an event that requires a replay operation, the parameter is inspected to determine that no message enqueued prior to a particular message $M_1$ should be re-enqueued during the replay operation. The event may be a scheduled event, such as, for example, an orderly shutdown of the publisher, or an unscheduled event, such as, for example, a publisher or a system failure. During the replay operation, the publisher re-enqueues in the queue one or more messages, where the one or more messages were previously enqueued by the publisher after the particular message $M_1$.

In an embodiment, a method for propagating messages in a distributed system is described. A set of messages enqueued in a source queue are sent to one or more destination queues. An acknowledgement is received from each of the one or more destination queues, where the acknowledgement indicates which messages of the set of messages have been consumed at the particular destination queue. Based on the acknowledgements, one or more messages of the set messages are removed from, or otherwise ceased to be maintained in, the source queue.

Other aspects encompass a computer-readable medium configured to carry out the foregoing steps. In addition, the techniques described herein may be implemented in a variety of computer systems including, but not limited to, Database Management Systems (DBMSs), Operating Systems (OSs), e-mail exchange systems, Internet information systems, information indexing systems, and telecommunication network systems.

II. Publisher Flow Control for Message Queues

In one operational context, publishers are enqueueing messages in a shared queue in volatile memory, and consumers are consuming the messages. Each publisher may be associated with one or more consumers. When a particular publisher is enqueueing messages in the queue faster than its consumers can consume the messages, the particular publisher will gradually consume more and more of the memory that is allocated to the queue. Thus, the particular publisher will gradually "flood" the queue and will "starve" the other publishers for publishing messages in the queue. Similarly, if a particular publisher has consumers that are much slower in consuming messages than the consumers of the other publishers that share the queue, the particular publisher also consumes more and more of the memory allocated to the queue at the expense of the other publishers.

To address this situation, techniques are described hereafter for restricting the ability of a particular publisher to publish messages in the queue when certain conditions are met. The mechanism by which a publisher is restricted from publishing messages in the queue when certain conditions are met is also referred to herein as placing the publisher in "Publisher Flow Control".

Publisher Flow Control Overview

FIG. 1A is a block diagram that illustrates an operational context in which an embodiment may be implemented. Computer system 100 comprises a queue 102 in volatile memory. Queue 102 is configured to receive messages from a plurality of publishers, such as, for example, publisher 104 ("Pub1"), publisher 106 ("Pub2"), and publisher 108 ("Pub3"). The messages enqueued in queue 102 are consumed by a plurality of consumers, such as, for example, consumer 110 ("Consumer1"), consumer 112 ("Consumer2"), and consumer 114 ("Consumer3").

Further, one or more consumers may be associated with a particular publisher, and any particular consumer may consume messages enqueued by any publisher of the plurality of publishers. For example, in the operational context illustrated in FIG. 1A, consumers 110, 112, and 114 may be associated with, and may be configured to consume messages enqueued in queue 102 by, publisher 104. Consumer 114 may be also associated with, and may be configured to consume messages enqueued in queue 102 by, both publishers 106 and 108. In a different operational context, the techniques described herein may be implemented on a single publisher that enqueues messages in a single queue for a single consumer. Thus, the techniques described herein are not limited to being implemented in an operational context with a particular number of publishers and consumers, and the operational context depicted in FIG. 1A is to be regarded in an illustrative rather than a restrictive sense.

In one embodiment, separate conditions are associated with each publisher of a plurality of publishers that enques messages in a queue. In this way, the relative speed of each publisher of the plurality of publishers that publish messages in the shared queue is taken into account, while at the same time accounting for the relative speed of the one or more consumers that are associated with each publisher. Depending on how the conditions are set for each publisher, the fastest pairings of publishers-consumers are allowed to go at a faster pace, while the slower publisher-consumer pairings may go at a slower pace. At the same time, the fastest consumer or consumers of a particular publisher can continue consuming messages without being penalized by another consumer of the particular publisher that is too slow.

The conditions are specific to each publisher and are based on the current usage of the queue by this particular publisher. When a condition that is based on the current usage of the queue by a publisher is satisfied, the publisher is placed in Publisher Flow Control in order to restrict the publisher from publishing any more messages to the queue. In this way, if a publisher is too fast or if the consumers of the publisher are too slow, the publisher will be restricted from publishing too many unconsumed messages in the queue and thus will be prevented from starving out the other publishers that publish messages to the same queue.

In one embodiment, in addition to the conditions being publisher-specific, the restrictions on a publisher that are imposed based on the conditions may also be publisher-specific. Thus, even though the conditions associated with a particular publisher may be satisfied, and even though the restrictions associated with the particular publisher may be imposed on the publisher, the other publishers that enqueue messages in the same queue are not affected. In this way, each publisher is affected only by its current usage of the queue without affecting the other publishers that publish messages to the queue.

For example, referring to the publishers and subscribers depicted in FIG. 1A, suppose that Pub1 enqueues messages in queue 102 that are consumed by Consumer1, Consumer2, and Consumer3. Suppose also that Consumer1 is the fastest consumer. In some situations, Pub1 may enqueue messages much faster than even the fastest consumer, Consumer1 can consume. In this situation, Pub1 will eventually fill up the queue and consume all of the memory allocated to the queue. To address this situation, in one embodiment Pub1 is placed in Publisher Flow Control. In this embodiment, when certain conditions are satisfied Pub1 will be stopped from publishing until the conditions change to such an extent that Pub1 will be able to continue without "flooding" the queue. In other words, in Publisher Flow Control, when Pub1 tries to enqueue any more messages beyond what a condition associated with Pub1 will allow, Pub1 will get an error notifying it that it cannot enqueue any messages until the situation indicated by the conditions is resolved. When the situation indicated by the conditions is resolved, Pub1 is allowed to go ahead and enqueue its messages again.

In one embodiment, a publisher may be blocked from publishing in the queue until the condition that caused the publisher to be blocked is resolved. In this embodiment, the publisher does not have to poll the queue to determine whether the condition is resolved. In another embodiment, the publisher is able to publish at the speed of its fastest consumer.

Since the conditions are specified on a per-publisher basis, Pub2 will not feel the effect of Pub1's suspension from enqueueing messages, and Pub1 will not be able to flood the entire queue with its messages. Thus, even though Pub1 and Pub2 publish to the same queue, Pub2 will be able to go uninterrupted at its own pace. Whenever the situation with Pub1 is resolved, Pub1 will be able to continue its publishing. In this way, the Publisher Flow Control mechanism restricts the ability of a particular publisher to enqueue messages in the shared queue, while allowing other publishers to continue normal operation.

Restrictions Imposed on a Publisher in Publisher Flow Control

When a condition based on the current usage of a queue by a publisher is satisfied, a variety of restrictions may be imposed on the publisher in order to restrict the ability of the publisher to enqueue messages in the queue. For example, in an embodiment, in response to an attempt by a publisher to enqueue a message in the queue, a determination is made whether a condition associated with the publisher is satisfied. If the condition is satisfied, then the publisher is not allowed to enqueue the message in the queue. In addition to, or instead of, restricting the publisher from enqueueing the message in the queue, the publisher may also be restricted from enqueueing any more messages in the queue until a second condition is satisfied or until a predetermined period of time elapses from the attempt to enqueue the message in the queue.

In one embodiment, the restrictions imposed on the ability of a publisher to enqueue messages in a queue, when a condition associated with the specific publisher is satisfied, may include decreasing the rate at which the publisher enqueues messages in the queue. For example, decreasing the rate at which a publisher enqueues messages in the queue may be achieved by decreasing the execution priority of the publisher. The execution priority determines when and for how long the publisher may use the one or more processors of the computer system to execute one or more of its instructions. Lowering the execution priority of the publisher will slow the publisher down, and consequently the rate at which the publisher produces and enqueues messages will be decreased.

In another example, decreasing the rate at which a publisher enqueues messages in the queue may be achieved by decreasing the amount of computing resources allocated to the publisher, such as, for example, the volatile memory allocated to the publisher and the network bandwidth allocated to the publisher if the publisher enqueues the messages over a network connection. Thus, there are a variety of means for restricting the publisher from enqueueing messages in the queue, and the techniques described herein are not limited to using any particular means.

Conditions Triggering Publisher Flow Control

The publisher-specific conditions that may trigger placing a particular publisher in Publisher Flow Control may be based on a variety of parameters associated with the current usage of a queue by the particular publisher including, but not limited to, the number of total messages enqueued by the particular publisher, the number of total messages consumed by at least one but not all consumers of the particular publisher, the number of messages not consumed by any consumer of the particular publisher, the number of messages of the particular publisher that are spilled to permanent store due to old age, the amount of available volatile memory allocated to the queue, the size of any message enqueued in the queue by the particular publisher, the percentage of the queue used by the messages of the particular publisher, and the rate at which the particular publisher enqueues messages in the queue. Further, the publisher-specific conditions may be based on any combination of these parameters.

For example, the current usage of a queue by a publisher may be associated with the number of messages enqueued in the queue by the publisher that are not consumed by any consumer associated with the publisher. The messages enqueued by the publisher that are not consumed by any consumer associated with the publisher are also referred to herein as the outstanding messages of the publisher. The condition that may trigger placing the publisher in Publisher Flow Control may be based on whether the number of outstanding messages of the publisher exceeds a predetermined threshold number of outstanding messages that is specified for the publisher. Thus, when the publisher attempts to enqueue a message in the queue, the condition is checked by determining whether the number of outstanding messages of the publisher exceeds the threshold. If the number of outstanding messages exceeds the threshold, the publisher is placed in Publisher Flow Control. If the number of outstanding messages does not exceed the threshold, the publisher is allowed to enqueue the message in the queue.

In one embodiment, the number of outstanding messages of the publisher may be determined by directly keeping track of that number in a parameter associated with the publisher. For example, a flag may be associated with each enqueued message and the flag may be set once the message is consumed by a consumer. The number of outstanding messages of a publisher is then directly determined by counting the messages, enqueued by this publisher, that do not have the flag set. Alternatively, or in addition, the number of outstanding messages of the publisher may be determined by maintaining a message count for the publisher, and updating the count correctly based on a flag associated with each message enqueued by the publisher.

In some embodiments, the number of outstanding messages of a publisher may be determined as the difference between the total number of messages enqueued in the queue by the publisher and the number of messages enqueued by the publisher that have been consumed by at least one consumer associated with the publisher. In this embodiment, the total number of messages enqueued by the publisher and the number of messages enqueued by the publisher that have been consumed by at least one consumer are stored in separate parameters associated with the publisher. The number of outstanding messages of the publisher is determined as the difference between the values of the two parameters, and is compared to the threshold number of outstanding messages specified for the publisher in order to determine whether the condition triggering Publisher Flow Control is satisfied.

The threshold number of outstanding messages of a particular publisher may be specified by a user, such as, for example, a system administrator, or may be set as part of automatically tuning the computer system. In one embodiment, where multiple publishers and multiple consumers share the same message queue, all publishers are assigned the same quality of service by the queue, that is, no publisher has a priority over any other publisher to enqueue messages in the queue. In this embodiment, each publisher is allowed the same threshold number of outstanding messages, and in this way each publisher is provided with the same priority in using the queue.

The threshold number of outstanding messages may be a fixed number, such as, for example, 10,000 outstanding messages, and may be the same for each publisher. In this example, the condition triggering Publisher Flow Control would indicate, among other things, that any publisher is allowed to enqueue 10,000 messages before any of its consumers starts consuming the messages. If there are no consumers alive, the publisher will be able to enqueue 10,000 messages. When the publisher tries to enqueue the $10,001^{st}$ message, the condition will be satisfied and the publisher will receive an error notifying it that it has too many outstanding messages. The publisher is then placed in Publisher Flow Control.

In an embodiment where multiple publishers and multiple consumers share the same message queue, each publisher may be assigned a different priority of using the queue. In addition, or instead of, the publishers may be assigned to different levels of priority. For example, Operating System (OS) processes may be assigned a High Level of priority and user processes may be assigned a Low Level of priority. In this embodiment, a higher threshold number of outstanding messages is associated with the OS processes, and a lower threshold number of outstanding messages is associated with the user processes. In this way, the OS processes are given a higher priority by the queue because they are allowed to enqueue more outstanding messages than the user processes.

In some embodiments, a different threshold number of outstanding messages of a condition may be defined for each publisher of a plurality of publishers that share the same queue based on the specific rate of publishing of each publisher. The rate of publishing of each publisher may be determined based on keeping track of the usage of the queue by the publisher over a period of time. In addition, in some embodiments the threshold number of outstanding messages specified in a condition for a particular publisher may be dynamically changed if there are sudden drops or increases in the rate at which the particular publisher enqueues messages in the queue.

The threshold number of outstanding messages specified for a publisher may also depend on the specific computer system which implements the publisher, its consumers, and the message queue. Further, the threshold number of outstanding messages should not be set too small because otherwise a publisher will not be able to enqueue sufficient number of messages and will starve its consumers. On the other hand, the threshold number should not be set too high because otherwise the condition triggering Publisher Flow Control will rarely be satisfied and the publisher will be able to flood the queue. In some computer systems, such as, for example, a distributed messaging system that propagates messages across a network, the threshold number of outstanding messages may also have to account for the lag between a publisher publishing and a consumer consuming.

In some embodiments, the publisher-specific conditions that may trigger placing a particular publisher in Publisher Flow Control may be based on a combination of parameters associated with the current usage of a queue by the publisher. For example, one condition may be based on a memory parameter indicating an amount of available non-volatile memory and the number of outstanding messages of the particular publisher. The memory parameter may be associated with the total amount of free memory in the computer system, or with the amount of free memory of the memory allocated to the particular queue. The condition based on the memory parameter and the number of outstanding messages of the publisher may state that the publisher is to be placed in Publisher Flow Control if the amount of available memory is below a certain predetermined amount and the number of outstanding messages of the publisher exceeds a predetermined threshold number. In this way, the queue can make sure that it will have at least a certain amount of free memory at any given time.

In some embodiments, where publishers enqueue messages of different or variable sizes in a shared queue, the publisher-specific conditions triggering the placement of a particular publisher in Publisher Flow Control may be based on the percentage of the maximum size of the queue that is used by messages enqueued by the particular publisher. For example, the percentage of the maximum size of the queue used by the particular publisher may be determined as the ratio of the total of the size of all messages enqueued by the particular publisher to the maximum amount of the memory allocated to the queue.

Since different computer systems may have different requirements for implementing shared message queues, different implementations of a shared message queue may take into account different parameters associated with the usage of the queue by particular publishers and may employ a wide variety of conditions based on the parameters for triggering Publisher Flow Control. Thus, the techniques described herein do not depend on any particular parameters or conditions, and the provided examples of conditions, parameters, and thresholds are to be regarded in an illustrative rather than a restrictive sense.

Conditions Triggering Publisher Flow Control in Embodiments Implementing Bounded Guaranteed Delivery In some embodiments, the techniques described herein are implemented with respect to a message queue that is used in conjunction with a storage space in permanent store, where a plurality of publishers share the queue, and the permanent store is used to spill messages from the queue. In these embodiments, the conditions that trigger placing a particular publisher in Publisher Flow Control may be based at least in part on one or more parameters that are associated with the current usage of the permanent store by the particular publisher, such as, for example, parameters indicating the number of various messages spilled to the permanent store.

In one embodiment, the Publisher Flow Control techniques described herein may also be implemented with respect to a plurality of publishers that share a message queue that supports a technique for Bounded Guaranteed Delivery of messages. The Bounded Guaranteed Delivery technique referred to herein provides for a guaranteed delivery of messages enqueued in a queue by repeatable publishers that are allocated a bounded amount of time to recover after a restart. For example, one or more of the plurality of publishers that share a message queue may be repeatable applications that require guaranteed "at least one-time" delivery of all messages to all intended consumers, even in the event of a memory or system failure. Furthermore, the repeatable publishers may also be required to complete any replay operations, which are performed in response to the occurrence of an event or a system failure, within a certain predefined period of time after a restart that results from the occurrence of the event or the system failure.

In this embodiment, in addition to, or instead of, placing a publisher in Publisher Flow Control when a condition based on the current usage of the message queue is satisfied, the publisher may also be placed in Publisher Flow Control when a recovery-time condition is satisfied. A recovery-time condition may be based on a parameter which indicates whether the publisher will be able to re-enqueue, within the allowed recovery time for the publisher, all messages that have not yet been consumed by all intended consumers. The techniques described herein provide for spilling messages to permanent store without impacting the recovery response times for repeatable publishers that require Bounded Guaranteed Delivery of messages.

The conditions associated with the plurality of publishers that share a message queue that provides for Bounded Guaranteed Delivery of messages are defined on a per-publisher basis. In addition, any restrictions imposed on the ability of the plurality of publishers to enqueue messages in the queue may also be specified separately for each publisher. For example, a publisher-specific condition associated with a publisher may be based on the current usage of the queue by the publisher and may be defined in such a way as to limit the number of messages enqueued by the publisher in the queue. The publisher-specific restrictions associated with the particular publisher may include restricting the publisher from enqueueing any more messages in the queue, or, when restricting the publisher from enqueueing messages is not feasible, may include spilling some of the messages previously enqueued by the publisher to the permanent store.

For example, in one embodiment a threshold time period allowed to a publisher for recovery after a restart may be set at 5 minutes. A condition associated with the publisher may be defined to determine whether any of the publisher's messages have been in a message queue for more than 5 minutes. If the condition is satisfied, then messages older than 5 minutes are spilled to permanent store. In this way, the message queue guarantees that no more than 5 minutes worth of messages (the messages that are in volatile memory and that are not spilled to the permanent store) will be lost if there is a volatile memory or system failure.

In addition to, or instead of, the above condition, in one embodiment a condition associated with the publisher may be based on whether the number of the publisher's outstanding messages that are spilled to permanent store due to old age exceeds a threshold number. A message may be spilled to permanent store due to old age if it has spent a certain predetermined amount of time in the queue. The number of a publisher's outstanding spilled messages may be used as an indication of whether the publisher is enqueueing messages too fast for even the fastest of its consumers. The number of outstanding spilled messages may be determined based on the current usages by the publisher of the queue and of the permanent store. The current usage of the queue by the publisher is associated with a first parameter indicating the number of messages that have been consumed by at least one consumer. The current usage of the permanent store by the publisher is associated with a second parameter indicating the number of messages of the publisher that have been spilled to the permanent store. Thus, the number of the publisher's outstanding spilled messages is determined as the difference between the values of the second parameter and the first parameter.

Figure 1B:
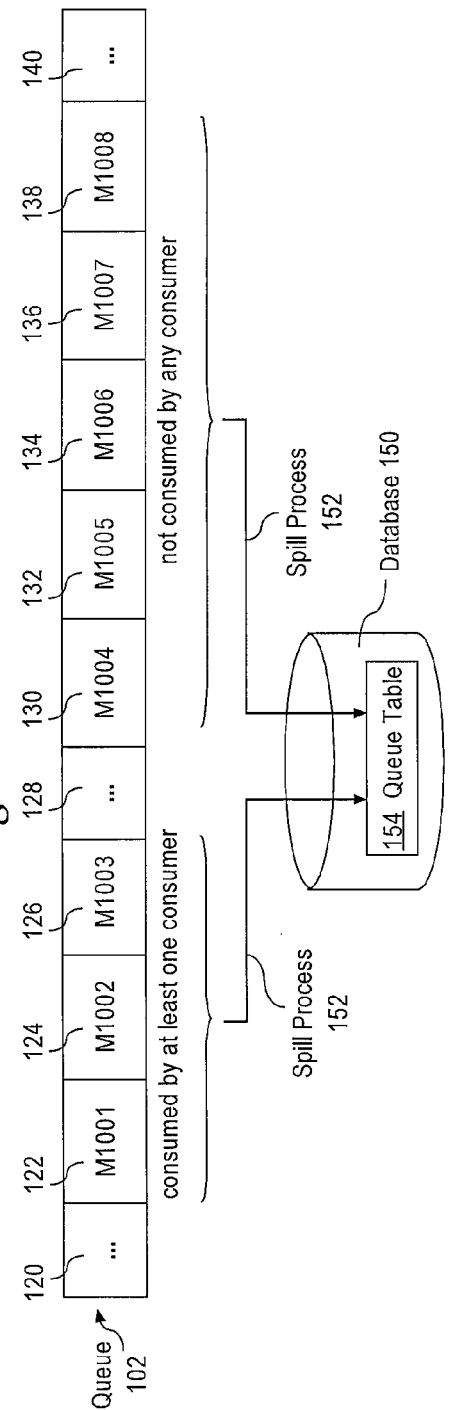
FIG. 1B is a block diagram that illustrates a message queue according to one embodiment.

For example, FIG. 1B is a block diagram that illustrates a message queue according to this embodiment. Queue 102 stores messages enqueued by a plurality of publishers. Queue 102 is associated with queue table 154 that is stored in database 150. Spill process 152 spills messages from queue 102 to queue table 154.

Suppose that message 122 ("M1001"), message 124 ("M1002"), message 126 ("M1003"), message 130 ("M1004"), message 132 ("M1005"), message 134 ("M1006"), message 136 ("M1007"), and message 138 ("M1008") are enqueued in queue 102 by publisher Pub1 of a plurality of publishers that share the queue. In FIG. 1B, ellipsis 120, 128, and 140 indicate portions of queue 102 that store messages enqueued by publishers other than Pub1. Further, suppose that messages 122, 124, 126, 130, 132, 134, 136, and 138 have been spilled to queue table 154 by spill process 152 due to old age. Of the messages enqueued by Pub1, messages 122, 124, and 126 have been consumed by at least one consumer. Thus, the number of outstanding spilled messages of Pub1 is determined as the difference of between the total number of spilled messages (8) and the number of messages consumed by at least one consumer (3). As depicted in FIG. 1B, Pub1 has five outstanding spilled messages, namely messages "M1004", "M1005", "M1006", "M1007", and "M1008". Thus, any outstanding messages of Pub1 that have been enqueued in the queue a relatively long time ago are accounted for when deciding whether to allow Pub1 to enqueue any more messages.

In this way, the condition that is based on the number of outstanding spilled messages of a particular publisher may be used to address a situation in which the consumers associated with the publisher are unavailable or are too slow, and there would be no point for the publisher to enqueue any more messages because there is no likelihood that the messages would be consumed by any consumer any time soon. Thus, when the number of outstanding spilled messages exceeds a predetermined threshold, the publisher is placed in Publisher Flow Control and is restricted from enqueueing any new messages until the situation is resolved.

Other embodiments that implement Bounded Guaranteed Delivery of messages may use different conditions that trigger placing a publisher in Publisher Flow Control. For example, in one embodiment the condition may be based on the amount of disk space allocated to the spilled messages of a particular publisher. Other embodiments may base their Publisher Flow Control triggering conditions at least in part on the historical usage of the permanent store by a publisher, or on particular patterns of permanent store usage that may depend on a particular time of the day. Thus, the examples of conditions and parameters described herein with respect to implementing the Publisher Flow Control techniques in embodiments providing Bounded Guaranteed Delivery of messages are to be regarded in an illustrative rather than a restrictive sense.

Conditions Triggering Return from Publisher Flow Control

The message-enqueueing restrictions imposed on a publisher that has been placed in Publisher Flow Control may be removed when a certain restriction-removing condition is satisfied. The restriction-removing condition may be based on the same parameters as the condition that triggered placing the publisher in Publisher Flow Control (the restriction-imposing condition), or may be based on different parameters. Furthermore, the restriction-removing condition may be the same condition as the restriction-imposing condition, or may be a different condition. When the restriction-imposing and restriction-removing conditions are the same condition, determining whether a publisher is placed in Publisher Flow Control comprises determining whether the condition is not satisfied, and determining whether to remove the restrictions comprises determining whether the condition is satisfied.

For example, the restriction-imposing condition may be defined as whether the number of outstanding messages enqueued by the publisher in a message queue is not over 10,000. When the number of outstanding messages of the publisher exceeds 10,000 messages, the condition is not satisfied and the publisher is restricted from enqueueing any more messages in the queue. In the embodiment in which the restriction-removing condition is the same condition as the restriction-imposing condition, the publisher is not allowed to enqueue any messages in the queue until the condition is satisfied. In the above example, the restriction-removing condition is satisfied when the number of outstanding messages of the publisher has fallen below 10,000 messages.

In one embodiment, the restriction-imposing and the restriction-removing conditions associated with a publisher may be different conditions that are based on the same parameters. In this embodiment, when the restriction-imposing condition is satisfied the publisher is placed in Publisher Flow Control and is restricted from enqueueing any more messages in the queue. When the (different) restriction-removing condition is satisfied, the publisher is allowed to continue enqueueing messages in the queue.

For example, the restriction-imposing condition may defined based on whether the number of outstanding messages enqueued by the publisher in the queue exceeds 10,000, and the restriction-removing condition may be defined based on whether the number of outstanding messages of the publisher is less than 7,000. In this case, both the restriction-imposing and the restriction-removing conditions are based on the same parameter (number of outstanding messages), but the threshold number associated with the conditions is different. Thus, when the number of outstanding messages of the publisher exceeds 10,000, the publisher is placed in Publisher Flow Control, and is restricted from publishing any more messages in the queue until the number of outstanding messages falls below 7,000. Defining the restriction-imposing and restriction-removing conditions in this way ensures that the publisher will not be switching in and out of Publisher Flow Control too frequently.

Similarly to employing a wide variety of restriction-imposing conditions, different implementations of a shared message queue may employ a wide variety of restriction-removing conditions based on a wide variety of parameters including, but not limited to, the parameters described herein with regards to the restriction-imposing conditions. Thus, the examples of restriction-removing conditions provided herein are to be regarded in an illustrative rather than a restrictive sense.

III. Bounded Guaranteed Delivery for Message Queues

In one embodiment, the techniques for managing messages described herein are implemented with respect to messages enqueued in a queue shared by a plurality of publishers. The publishers may be repeatable applications that require guaranteed "at least one-time" delivery of all messages to all intended consumers, even in the event of a memory or system failure. However, since the queue is in volatile memory, failure of the volatile memory or of the computer system may cause irreversible loss of messages. Furthermore, the publishers themselves may suffer a failure, and upon a restart they would have to re-enqueue all previously outstanding messages. Thus, when the messages in the queue are published by repeatable publishers that require guaranteed delivery of all messages to all intended consumers, the loss of messages due to queue or publisher failure may not be acceptable since the outstanding messages enqueued by repeatable publishers must be re-enqueued by the publishers in the order of the previous enqueueing.

For example, suppose that before the consumers associated with a particular repeatable publisher start up, the publisher enqueues 500 messages in a queue. Sometime thereafter, in response to the occurrence of an event the computer system on which the publisher is implemented shuts down. (The event may be an expected event, such as, for example, an orderly shutdown of the computer system by an administrator, or an unscheduled event, such as, for example, a volatile memory failure.) When the computer system is back on-line and the publisher is restarted, the publisher must perform a replay operation in which it must re-enqueue, in the same order, all 500 messages because the messages have not yet been consumed by any consumers. This may cause a problem for the repeatable publisher in situations where the publisher is allocated a predetermined bounded amount of recovery time after a restart for performing any message replay operations.

To address this situation, one embodiment provides a Bounded Guaranteed Delivery of messages by implementing a technique for managing messages in a message queue, where messages enqueued in the queue by a publisher are backed up to permanent store when one or more conditions are satisfied. In response to backing up the messages to permanent store, a parameter associated with the particular publisher is updated, where the parameter indicates a particular message, of the previously enqueued messages, that is the starting replay point for any replay operation that may need to be performed by the publisher. The one or more conditions that determine when to backup the messages enqueued by the publisher may be based on a variety of parameters that affect the recovery time of the publisher or on the cost incurred by the publisher in producing one or more messages.

For example, suppose that before any consumer associated with a repeatable publisher starts up, the publisher publishes 300 messages in a queue. According to the Bounded Guaranteed Delivery techniques described herein, these 300 hundred messages are spilled from the queue to a permanent store, and the $301^{st}$ message is marked as the replay point. Thereafter, the publisher continues to enqueue a total of 200 more messages before the computer system hosting the publisher fails. When the computer system is back on-line and the publisher restarts, the publisher inspects the replay point and finds out that it needs to re-enqueue in the queue the later 200 messages starting with the $301^{st}$ message (which is the replay point). The 300 messages previously enqueued and spilled to permanent store are recovered from the permanent store and are enqueued in the queue by the computer system that hosts the queue. In this way, the publisher needs to re-enqueue only 200 messages instead of 500, and consequently the recovery time for the publisher is significantly decreased.

Operational Context for Bounded Guaranteed Delivery

In embodiments of the Bounded Guaranteed Delivery techniques described herein, the messages enqueued in a queue by a publisher may be consumed by the consumers in any order, which may be the same or a different order than the order in which the messages were produced. The Bounded Guaranteed Delivery techniques described herein may also be implemented with respect to publishers that enqueue a stream of messages in a queue. An example of a publisher that produces a message stream is an application that retrieves other producer's messages from permanent store, and enqueues these messages in the queue for consumption by consumers. Another example of a message stream publisher is a database replication application that reads information from the database transaction logs (such as, for example, the redo logs), packs the information in messages, and enqueues the messages for consumption by other local or remote database applications or servers.

Figure 2A:
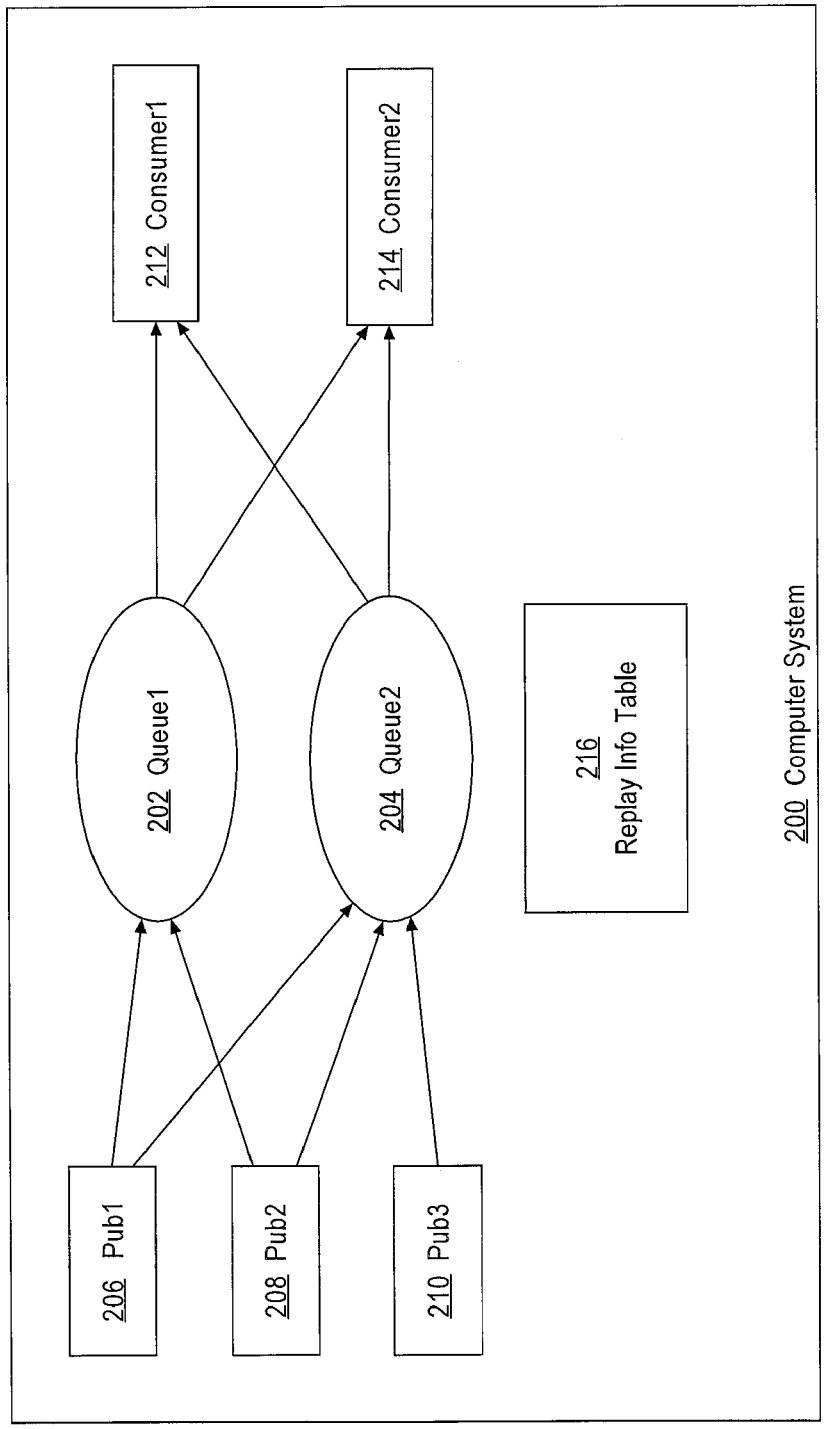
FIG. 2A is a block diagram that illustrates an operational context in which one embodiment may be implemented.

FIG. 2A is a block diagram that illustrates an operational context in which one embodiment of the Bounded Guaranteed Delivery techniques may be implemented. Computer system 200 includes publisher 206 ("Pub1"), publisher 208 ("Pub2"), and publisher 210 ("Pub3"). Computer system 200 also includes shared queue 202 ("Queue1") and shared queue 204 ("Queue2"), and consumer 212 ("Consumed") and consumer 214 ("Consumer2"). Computer system 200 includes Replay Info table 216, which stores the replay points associated with each publisher for each queue.

In operation, publishers 206 and 208 enqueue messages in both queue 202 and queue 204. Publisher 210 enqueues messages only in queue 204. Consumer 212 consumes messages from queue 202 that are enqueued by publishers 206 and 208, and messages from queue 204 that are enqueued by publishers 206, 208, and 210. Similarly, consumer 214 also consumes messages from queue 202 that are enqueued by publishers 206 and 208, and messages from queue 204 that are enqueued by publishers 206, 208, and 210.

Messages from queues 202 and 204 may be spilled to permanent store (not shown in FIG. 2A) by one or more spill processes. Replay Info table 216 stores the replay point associated with each publisher for each queue. Replay Info table 216 must be stored in non-volatile permanent store, such as, for example, a table in a database or a file in a file system stored on disk, so that it is available for recovery after a system restart.

In this operational context, Table 1 provided below depicts the contents of Replay Info table 216 at a given point in time.

TABLE 1

REPLAY INFO TABLE FOR COMPUTER SYSTEM 200

| Queue  | Publisher | Replay Point |
|--------|-----------|--------------|
| Queue1 | Pub1      | 7,000        |
| Queue1 | Pub2      | 1850         |
| Queue2 | Pub1      | 650          |
| Queue2 | Pub2      | 1850         |
| Queue2 | Pub3      | 130          |

As shown in Table 1, the Replay Info table stores the replay points on a per-publisher, per-queue basis. This allows the implementation of the queues to account for the different rates at which different publishers may enqueue messages in the different queues. Furthermore, the per-publisher, per-queue storing of replay points allows a publisher to enqueue different types of messages in different queues, and to have different replay points for each different type of messages that the publisher produces. For example, as shown in Table 1, publisher Pub1 may have message 7,000 as the replay point in queue Queue1 for the type of messages Pub1 enqueues in Queue1, and message 650 as the replay point in queue Queue2 for a different type of messages that Pub1 enqueues in Queue2. In another example shown in Table 1, publisher Pub2 may have the same replay point (message 1850) in both Queue1 and Queue2, even though there may not be any relation between the Queue1-Pub2 and the Queue2-Pub2 pairs.

In response to the occurrence of an event that requires a publisher to perform a replay operation, the publisher checks the Replay Info table, and enqueues the message associated with the replay point and all messages that follow the replay point message, which may or may not have been enqueued prior to the occurrence of the event. For example, suppose that a system administrator of computer system 200 re-initializes queue Queue1. In response to this event, publishers Pub1 and Pub2 will be required to re-enqueue their messages. Publishers Pub1 and Pub2 inspect the contents of Replay Info table (for example, the contents shown in Table 1), and determine their respective replay points. Thus, Pub1 is required to re-enqueue in Queue1 messages 7,000 and above, and Pub2 is required to re-enqueue in Queue 1 messages 1850 and above. According to the techniques described herein, any outstanding messages of Pub1 (e.g. messages that have not been consumed by all intended consumers) that are numbered below 7,000 have been spilled to permanent store and are re-enqueued in Queue1 automatically by computer system 200. Thus, as far as Pub1 is concerned, it does not have to re-create and/or re-enqueue in Queue1 any messages below the replay point of message 7,000. Similarly, Pub2 does not have to re-enqueue any messages in Queue1 that are below its replay point for that queue (which replay point is message 1850).

Replay Points and Spilling Messages to Permanent Store

In one embodiment, the replay point in a sequence of messages enqueued by a publisher in a queue is the last (or oldest) message enqueued by the publisher that is not spilled to permanent store and that has not yet been consumed by all intended consumers. The replay point is stored on a per-publisher, per-queue basis, and is used to guarantee the delivery of the messages enqueued by the publisher that is associated with the replay point.

In other embodiments, the replay point may be any message that is enqueued in a queue by a publisher. In addition, in some implementations of queues shared by a plurality of publishers, the replay point associated with each publisher may be determined based solely on the messages enqueued in the queue by that publisher. Thus, the replay point associated with a publisher may be determined in a variety of different ways depending on the specific requirements and the configurations of different shared queues, and for this reason the examples of determining replay points provided herein are to be regarded in an illustrative rather than a restrictive sense.

In one embodiment that implements a Bounded Guaranteed Delivery of messages, the replay points associated with messages enqueued by publishers in a queue are used in conjunction with a spill process. The spill process may be configured to spill messages from the queue to permanent store on a per-publisher basis based on whether one or more conditions are satisfied. The one or more conditions may be associated with the amount of recovery time allowed for each publisher. The messages of a particular publisher that are spilled from the queue to the permanent store by the spill process are recoverable from the publisher's perspective because these messages do not need to be re-created or re-enqueued by the publisher even though the messages may not have been consumed by all intended consumers.

Figure 2B:
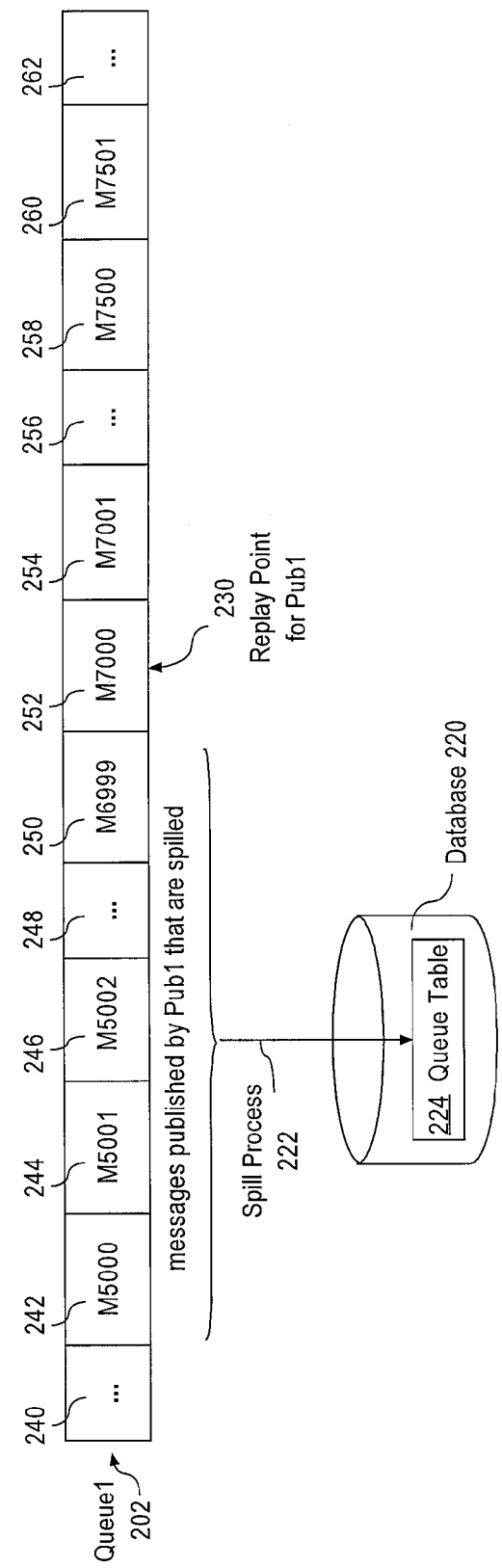
FIG. 2B is a block diagram that illustrates a message queue according to one embodiment.

FIG. 2B is a block diagram that illustrates an example of a message queue at a given point in time according to this embodiment. Queue 202 ("Queue1") is associated with a plurality of publishers that enqueue messages in the queue. Queue 202 is also associated with queue table 224 that is stored in database 220. Spill process 222 spills messages from queue 202 to queue table 224. In this embodiment, either spill process 222 or another system process may be responsible for retrieving messages from queue table 224 and re-enqueueing the retrieved messages in queue 202.

A particular publisher, Pub1, has enqueued message 242 ("M5000"), message 244 ("M5001"), message 246 ("M5002"), message 250 ("M6999"), message 252 ("M7000"), message 254 ("M7001"), message 258 ("M7500"), and message 260 ("M7501"). Ellipsis 240 indicates that a number of messages have been enqueued in queue 202 by the plurality of publishers, which number of messages includes messages below M5000 that have been enqueued by publisher Pub1. Similarly, ellipsis 248 indicates that a number of messages have been enqueued in queue 202 by the plurality of publishers, which number of messages includes any messages of Pub1 between M5002 and M6999. Ellipsis 256 indicates that a number of messages have been enqueued in queue 202 by the plurality of publishers, which number of messages includes messages of Pub1 between M7001 and M7500. Ellipsis 262 indicates that a number of messages have been enqueued in queue 202 by publishers other than Pub1.

In the example depicted in FIG. 2B, publisher Pub1 has enqueued in queue 202 7,501 messages. The first 5,000 of these messages (in particular, messages M4999 and below) have been consumed by all consumers for which the messages were intended. Messages from M5000 to M6999 have been spilled to permanent store (queue table 224) by spill process 222. Thus, the replay point 230 associated with Pub1 for queue 202 is message 252 (i.e. message M7000). In the example depicted in FIG. 2B, after restarting for whatever reason, publisher Pub1 will continue with enqueueing messages from M7000 to M7501. The messages between M5000 and M6999 will be retrieved from queue table 224 and will be re-enqueued in queue 202 by spill process 222. Thus, publisher Pub1 does not need to re-enqueue any messages that were enqueued prior to enqueueing message M7000, which is the replay point 230 for publisher Pub1.

Conditions Determining Whether to Spill Messages to Permanent Store

In one embodiment, messages enqueued in a queue by a publisher are spilled to permanent store if one or more conditions are satisfied. In this embodiment, the one or more conditions may be based on the recovery time allowed to the publisher after a restart for performing message replay operations.

The selection of a particular replay point provides a publisher with a particular recovery window of a number of messages that need to be re-enqueued by the publisher in the event of a publisher restart or a queue failure. The recovery window of messages may be based on the number of messages the publisher is allowed to re-create and/or re-enqueue in response to the occurrence of an event that requires a replay operation. The event that requires a replay operation may be any event that can occur in a computer system hosting the publisher or the message queue including, but not limited to, publisher failure, message queue failure, computer system failure, computer system shutdown initiated by an administrator, and any other event caused by a user, an application, or a OS process of the computer system.

In the example of the message queue depicted in FIG. 2A, suppose that publisher Pub1 is allowed to spend no more than five minutes upon restart for re-enqueueing any messages in queue 202 in a replay operation. Suppose also that for five minutes publisher Pub1 cannot produce and re-enqueue in queue 202 more than 501 messages, that is, 501 messages are five minutes of work for publisher Pub1. Based on this, the recovery window of messages for publisher Pub1 is 501 messages. Thus, at any given time the replay point for publisher Pub1 is set such that the number of messages that Pub1 needs to re-enqueue in queue 202 does not exceed the number of messages in the recovery window of 501. At the particular point in time depicted in FIG. 2B, since the last message enqueued by publisher Pub1 in queue 202 is M7501, the replay point 230 is set at message M7500, which amounts to a total of 501 messages. Any message enqueued before message M7500 that has not yet been consumed by all intended consumers is spilled to queue table 224. In other words, in this example the condition determining whether one or more messages are spilled to disk is associated with the recovery window of 501 messages for publisher Pub1 for queue 202, which recovery window is based on the maximum recovery time of five minutes that is allowed for the publisher.

In some embodiments, the conditions determining whether to spill a message to permanent store may be based on the amount of the recovery time that is selected in such a way as to optimize the performance of the publisher. For example, if the recovery time is too low, then messages enqueued in the queue by the publisher are spilled to permanent store shortly after being enqueued, which results in a frequent spilling of messages. If the recovery time is too high, then the amount of work performed by the publisher in a replay operation upon re-start is increased.

In some embodiments, the conditions determining whether to spill a message to permanent store may be based on a recovery time that is reciprocal to the cost of generating a message by the publisher. In these embodiments, the more expensive in terms of computing resources it is for the publisher to generate a message, the lower the recovery time is configured. In other words, the conditions determining whether to spill a message to permanent store may be associated with the cost incurred by the publisher in producing the messages. The cost of producing the messages may be determined based on a variety of criteria including, but not limited to, the time it takes the publisher to create a message, the amount of computing resources (such as, for example, memory, Central Processing Unit (CPU) time, temporary disk space, and network bandwidth) it takes to produce a message, the number of messages enqueued since the last message that was consumed by all intended consumers, and the size or the nature of the produced messages.

IV. Repeatable Message Streams for Message Queues in Distributed Systems

Overview of One Embodiment

The Bounded Guaranteed Delivery techniques described herein may be implemented in a distributed computer system. The messages enqueued in a source queue that is established at one node of the distributed system are propagated to one or more destination queues that are established at one or more different nodes of the distributed system. In this embodiment, the plurality of publishers that enqueue messages in the source queue are repeatable applications that require guaranteed "at least one-time" delivery of all messages to consumers that may be on the same node as the source queue or on nodes that host the destination queues.

The Bounded Guaranteed Delivery techniques described herein maintain, for each publisher that enqueues messages in a source queue, a replay point that indicates a particular message. In response to the occurrence of an event that requires a particular publisher to perform a replay operation, the particular publisher re-enqueues in the source queue the particular message indicated by the replay point and all messages previously enqueued after the particular message, but does not re-enqueue any message that was previously enqueued prior to the replay point. However, since the messages enqueued by the particular publisher in the source queue are propagated to destination queues, a situation may arise in which a message that is enqueued in the source queue before the replay point (which message is not re-enqueued by the particular publisher in a replay operation) is not yet consumed by all consumers at the destination queues when the event occurs.

For example, suppose that at a given point in time a publisher enqueueing messages in a source queue has its replay point at message 4,000 and has enqueued a total of 4,500 messages in the source queue, but the propagation process that propagates the messages of the publisher from the source queue to the destination queues has propagated the messages only up to message 3,000. If at that given point in time the publisher needs to perform a replay operation, the publisher re-enqueues messages from 4,000 to 4,500. However, since the messages from 3,000 to 3,999 have not yet been propagated to the destination queues, the consumers of the messages at the destination queues have not yet seen the messages from 3,000 to 3,999, and will not be able to see these messages at all since the publisher does not re-enqueue them in the source queue during the replay operation.

To address this situation, one embodiment provides a technique for managing and propagating messages in a distributed system, where the messages are enqueued in a source queue at one node of the distributed system. A set of messages enqueued in the source queue by a particular publisher are sent to one or more destination queues at different nodes of the distributed system by a propagation process. The propagation process receives, from each destination queue, an acknowledgement indicating which messages of the set of messages have been consumed at that destination queue. Based on the acknowledgements, the propagation process determines which one or more messages of the set of messages can be deleted from, or otherwise ceased to be maintained at, the source queue. The one or more messages that are ceased to be maintained may include any message that has been consumed by all consumers, at the destination queues, for which the set of messages was intended.

For example, suppose that the messages a publisher enqueues in a source queue are an ordered sequence of messages. Suppose also that at a given point in time the publisher has its replay point for the source queue at message 4,000 and has enqueued a total of 4,500 messages. Suppose also that at that point in time a propagation process has propagated to destination queues Queue2 and Queue3 the messages up to message 3,000. Further, suppose that at that point in time the propagation process has received: (1) an acknowledgement from Queue2 indicating that all intended consumers of the messages at Queue2 have consumed the messages up to message 2,700, and (2) an acknowledgement from Queue3 indicating that all intended consumers of the messages at Queue3 have consumed the messages up to message 2,600. If at that given point in time the publisher needs to perform a replay operation, the publisher re-enqueues messages from 4,000 to 4,500. At that point in time, the propagation process also determines, based on the message acknowledgements received from destination queues Queue2 and Queue3, that messages below and including message 2,600 (which is the lowest numbered message from messages 2,700 and 2,600 as indicated by the acknowledgements received from Queue2 and Queue3, respectively) have been consumed by all intended consumers at all destination queues, and ceases to maintain these messages in the source queue. The propagation process keeps any messages enqueued after message 2,600 in the source queue until acknowledgements are received indicating that these messages are consumed by all intended consumers at both destination queue Queue2 and destination queue Queue3. Thus, the source queue is effectively made "repeatable" by keeping copies of messages in the source queue until an acknowledgement is received indicating that the messages have been consumed by all intended consumers at all destination queues.

Operational Context

In some embodiments, the techniques for propagating messages in a distributed system described herein are implemented with respect to source queues that store messages enqueued by repeatable publishers in ordered sequences. The repeatable publishers may be applications that require guaranteed "at least one-time" delivery of their messages in the source queue to all intended consumers in one or more destination queues. The techniques described herein may also be implemented with respect to publishers that enqueue a stream of messages in the source queue, where the consumers consume the messages in the stream in the order in which the messages were enqueued in the source queue. The techniques described herein may further be implemented with respect to publishers that enqueue an ordered sequence of messages in the source queue, where the consumers associated with the publishers may consume the messages out of order or in any order the consumers prefer. Thus, the examples of different implementations of the techniques described herein are to be regarded in an illustrative rather than a restrictive sense.

Figure 3:
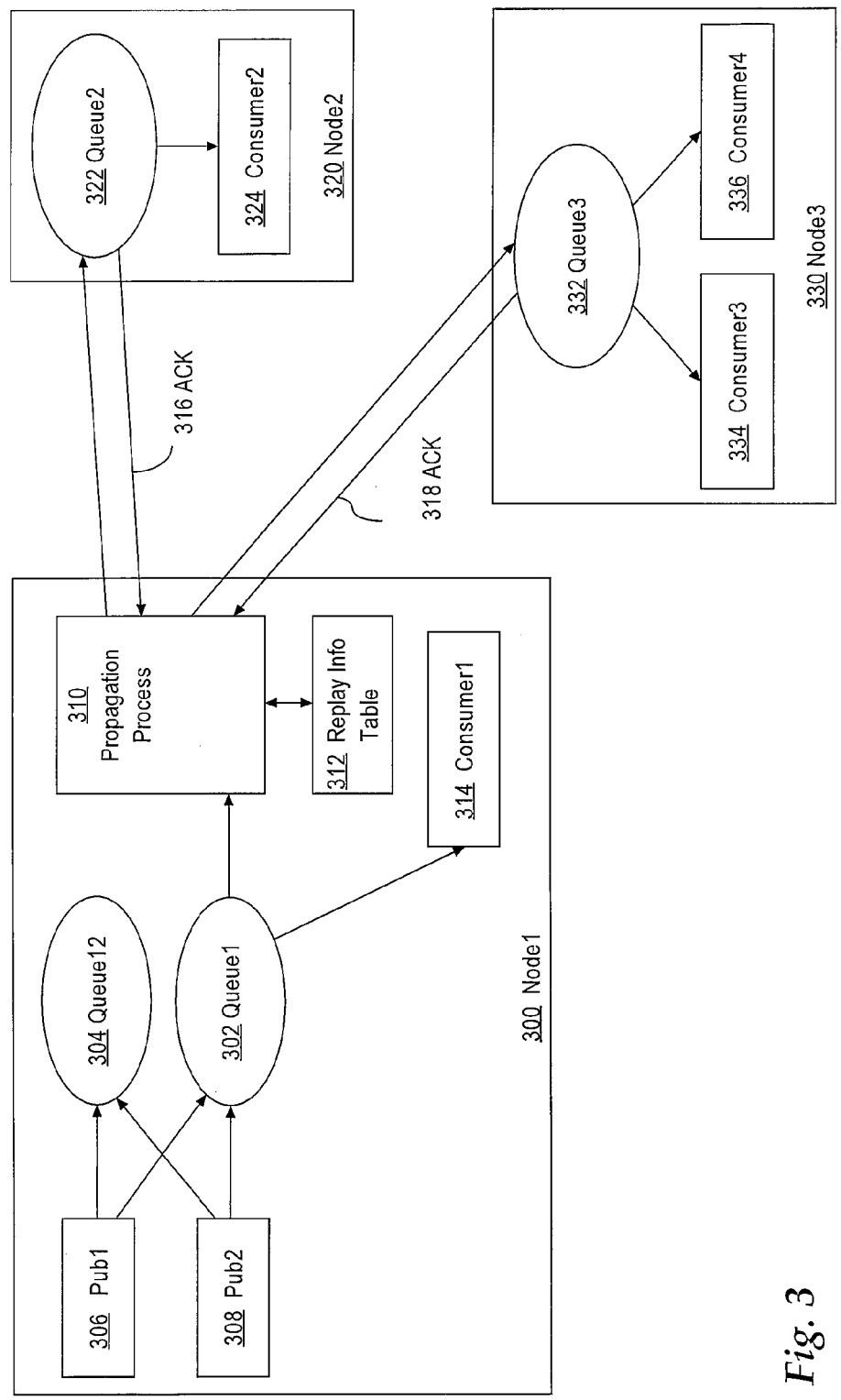
FIG. 3 is a block diagram that illustrates an operational context for propagating messages in a distributed system according to one embodiment.

FIG. 3 is a block diagram that illustrates an operational context for propagating messages in a distributed system according to one embodiment. The distributed system may be any computer system that is capable of executing one or more of its operations or functionalities on two or more nodes, which nodes may be located on the same hardware platform or may be located on separate hardware platforms that are connected over a network. Examples of such distributed computer systems include, but are not limited to, database management systems, operating systems, e-mail exchange systems, Internet information systems, information indexing systems, and telecommunication network systems.

Referring to FIG. 3, a distributed system includes node 300 ("Node1"), node 320 ("Node2"), and node 330 ("Node3"). Node 300 includes publisher 306 ("Pub1") and publisher 308 ("Pub2"). Publishers 306 and 308 enqueue messages in queue 302 ("Queue1") and queue 304 ("Queue12"). The messages in queue 302 are propagated by propagation process 310 to nodes 320 and 330. The messages in queue 302 are also consumed by consumer 314 ("Consumer1") that is local to node 300. The messages in queue 304 are consumed by consumers (not shown) that are local to node 300.

Propagation process 310 maintains the information received in any acknowledgements from nodes 320 and 330 in replay info table 312. Replay info table 312 may be stored in non-volatile permanent store associated with node 300. Replay info table 312 stores information from any acknowledgements received from nodes 320 and 330, and may also store information indicating the replay points for publishers 306 and 308 of node 300.

Node 320 includes queue 322 ("Queue2"), which stores messages propagated by propagation process 310 from queue 302 and may also store messages enqueued by any publishers that are local to node 320. Node 320 also includes consumer 324 ("Consumer2"), which is configured to consume messages enqueued in queue 322.

Node 330 includes queue 332 ("Queue3"), which stores messages propagated by propagation process 310 from queue 302 and may also store messages enqueued by any publishers that are local to node 330. Node 330 also includes consumer 334 ("Consumer3") and consumer 336 ("Consumer4") that are configured to consume messages enqueued in queue 332.

In operation, publishers 306 and 308 enqueue messages in queues 302 and 304. Propagation process 310 propagates the messages enqueued in queue 302 to queues 322 and 332, which are established on nodes 320 and 330, respectively. Propagation process 310 may propagate all messages enqueued in queue 302 by publishers 306 and 308, or may select which messages to propagate based on one or more subscription rules that may be associated with nodes 320 or 330, with queues 322 or 332, or with consumers 324, 334, and 336. In propagating the messages from queue 302, propagation process 310 keeps track of the messages it sends to queues 322 and 332 on a per-queue per-destination basis.

In some embodiments, the propagation process may also be used to propagate the messages enqueued in two or more source queues of a particular distributed system node. In other embodiments, there may be a separate propagation process that is dedicated to propagating messages enqueued in a particular queue. Further, some embodiments may have a replay info table on a per-propagation process basis, or there may one common replay info table for all propagation processes executing on a particular node. In some embodiments, the propagation process may execute on a particular node of the distributed system, and may provide propagation services for the queues on that particular node and also for all queues on any node of the distributed system. In other embodiments, the propagation process may execute on a "master" node that does not support any queues.

Referring to FIG. 3, propagation process 310 receives acknowledgements from queues 322 and 332, such as, for examples, acknowledgement 316 from queue 322 and acknowledgement 318 from queue 332. The acknowledgements received by propagation process 310 indicate which of the messages sent by the propagation process have been consumed by all intended consumers at the queue sending the acknowledgements. For example, acknowledgment 316 indicates which messages sent by propagation process 310 to queue 322 have been consumed by consumer 324, and acknowledgment 318 indicates which messages sent by propagation process 310 to queue 332 have been consumed by both consumers 334 and 336.

Similarly to keeping track of sent messages, propagation process 310 also keeps the information about consumed messages received in the acknowledgements on a per-queue per-destination basis in replay info table 312. In the embodiment depicted in FIG. 3, publishers 306 and 308 enqueue their messages in ordered sequences, and consumers 314, 324, 334 and 336 consume the messages in the order the messages were enqueued. In this embodiment, the information about consumed messages received in the acknowledgements from nodes 320 and 330 comprise the number of the highest message that is consumed by all intended consumers at the respective node. Further, in this embodiment replay info table 314 also stores the replay points for publishers 306 and 308 for both queue 302 and 304.

Table 2 provided below depicts the contents of replay info table 314 at a given point in time.

TABLE 2

REPLAY INFO TABLE FOR NODE 300

| Queue | Publisher | Replay Point |
|-------|-----------|--------------|
| Queue1 | Pub1 | 7,000 |
| Queue1 | Pub2 | 2,300 |
| Queue12 | Pub1 | 10,500 |
| Queue12 | Pub2 | 5,000 |
| Queue1 | Propagation_To_Queue2 | 2,250 |
| Queue1 | Propagation_To_Queue3 | 2,200 |

As shown in Table 2, the local replay points for publisher Pub1 in queues Queue1 and Queue12 are messages 7,000 and 10,500, respectively. The local replay points for publisher Pub2 in queues Queue1 and Queue12 are messages 2,300 and 5,000, respectively. Further, Table 2 stores the replay points for propagation process 310 that are associated with the queue-destination pairs of Queue1-Queue2 and Queue1-Queue3. For example, for the messages enqueued in queue Queue1, the propagation process has received acknowledgements only up to message 2,250 from queue Queue2 and up to message 2,200 from queue Queue3. The message numbers "2,250" and "2,200" reflect the order of the messages in Queue1 regardless of which publisher enqueued the messages. Thus, the latest message enqueued in Queue1 that is consumed by all consumers in queues Queue2 and Queue3 is the message numbered 2,200. According to this embodiment, the propagation process will keep in queue Queue1 all messages numbered 2,200 and above and will cease to maintain in the queue any messages numbered below 2,200.

Propagation Process as a Consumer for the Source Queue and a Publisher for the Destination Queues In one embodiment, the propagation process may be configured as a consumer with respect to the source queue, and a publisher with respect to the one or more destination queues. In this embodiment, the propagation process may also be configured to perform replay operations by re-enqueueing in a particular destination queue any messages that have not been consumed by all consumers at that particular destination queue. The propagation process may also have a separate replay point associated with each destination queue. In response to the occurrence of an event that requires the propagation process to perform a replay operation, the propagation process inspects its replay point for each separate destination queue. The propagation process then re-enqueues in each destination queue the messages previously enqueued in the source queue after the replay point associated with that destination queue. The propagation process removes a message from the source queue only after all the consumers at all the destination queues have consumed the message.

In this embodiment, in operation the propagation process performs the following steps: after sending messages to a destination queue, keeping track of the highest numbered message that has been sent to each destination queue; receiving an acknowledgement from each destination queue which indicates the highest numbered message that all consumers at that destination queue have consumed; based on all acknowledgements received from each destination queue, determining the lowest numbered message that has been consumed by all consumers of the destination queues; and ceasing to maintain in the source queue any message that is numbered lower than the lowest numbered message.

Since an acknowledgement received from a particular destination queue indicates the number of the highest message consumed at that destination queue, in response to the occurrence of an event that requires a replay operation, the propagation process will re-enqueue in the particular destination queue all messages from the source queue that have been enqueued after the highest consumed messages at the particular destination queue. Thus, for each destination queue, the propagation process effectively starts any replay operation it needs to perform from the last message that was acknowledged by a particular destination queue.

V. Hardware Overview

Figure 4:
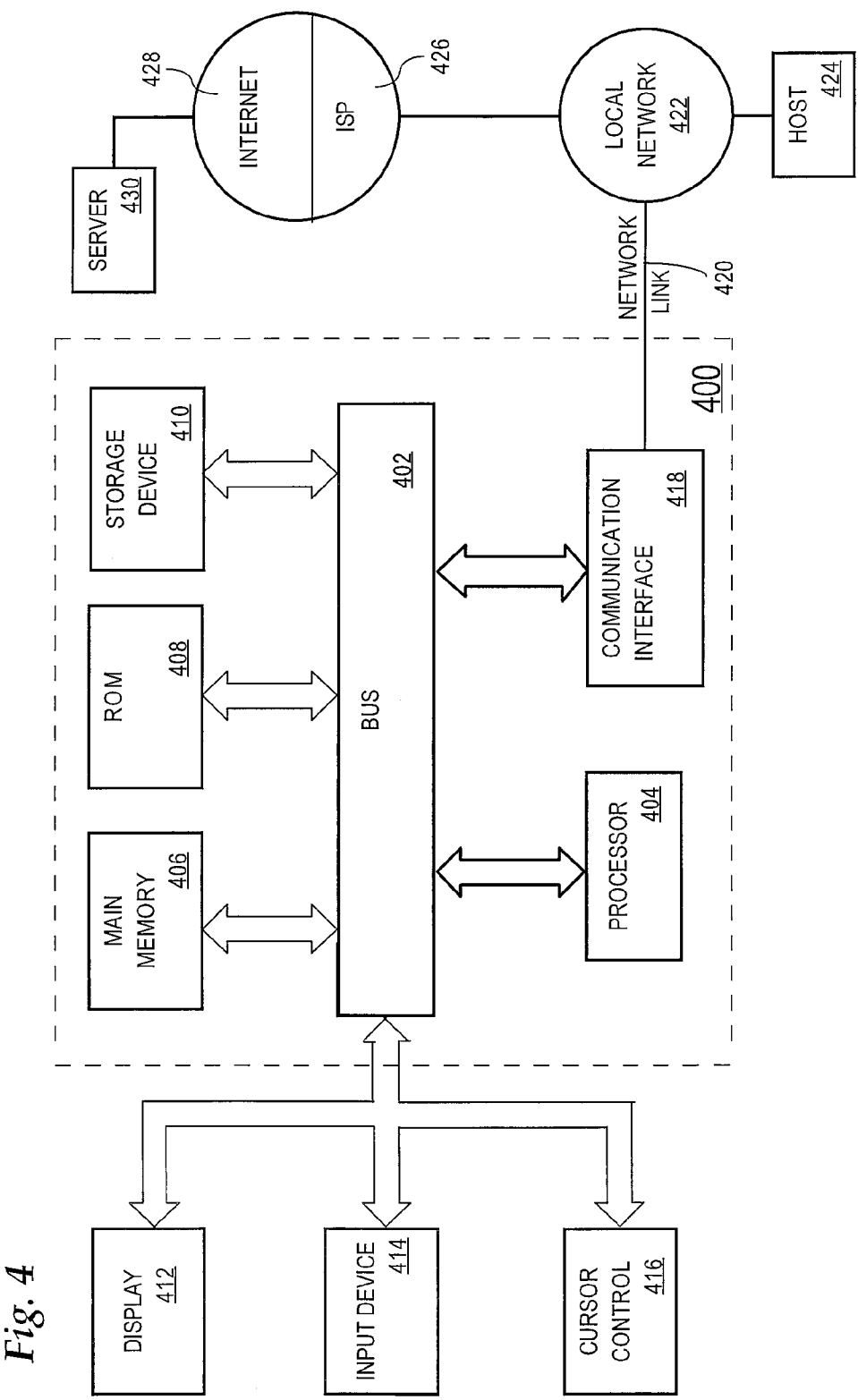
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM)

or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

in response to a publisher attempting to enqueue a message in a queue, determining whether a condition is satisfied;

wherein the publisher is a particular publisher of a plurality of publishers, wherein each publisher of the plurality of publishers enqueues messages in the queue;

wherein the queue is stored in volatile memory;

wherein the condition is based on the usage of the queue by the publisher; and based on whether the condition is satisfied, deciding whether to enqueue the message in the queue, wherein deciding whether to enqueue the message in the queue comprises:

if the condition is satisfied, then restricting the publisher from enqueueing the message in the queue; and if the condition is not satisfied, then allowing the publisher to enqueue the message in the queue;

wherein the method is performed by one or more computing devices.

2. The method of claim 1, wherein:

the publisher is associated with one or more consumers, wherein the one or more consumers consume the messages that are enqueued by the publisher in the queue.

3. The method of claim 2, wherein determining whether the condition is satisfied comprises determining whether the number of messages that are not consumed by any consumer of the one or more consumers exceeds a predetermined threshold number of messages that is specified for the publisher.

4. The method of claim 3, wherein:

the usage of the queue by the publisher is associated with:

a first parameter indicating the number of messages in the queue that were enqueued by the publisher, and a second parameter indicating the number of messages that have been consumed by at least one consumer of the one or more consumers; and the number of messages that are not consumed by any consumer of the one or more consumers is the difference between the value of the first parameter and the value of the second parameter.

5. The method of claim 1, further comprising determining, for each publisher of the plurality of publishers, whether that publisher is permitted to enqueue messages in the queue based on the usage of the queue by that publisher.

6. The method of claim 1, wherein:

the usage of the queue by the publisher is associated with at least one of:

a first parameter indicating the number of messages in the queue that were enqueued by the publisher;

a second parameter indicating the number of messages enqueued by the publisher that have been consumed by at least one consumer of one or more consumers that are associated with the publisher;

a third parameter indicating the size of any message that is enqueued by the publisher in the queue; and a fourth parameter indicating the amount of volatile memory allocated for the queue; and the condition is based on at least one of the first parameter, the second parameter, the third parameter, and the fourth parameter.

7. The method of claim 1, wherein the method further comprises notifying the publisher that the message has not been enqueued in the queue when the condition is satisfied.

8. The method of claim 1, wherein:

the condition is a first condition; and the method further comprises, if the first condition is satisfied, then restricting the publisher from enqueueing any more messages in the queue until a second condition is satisfied.

9. The method of claim 8, wherein the second condition is different than the first condition.

10. The method of claim 8, wherein the second condition is the same as the first condition.

11. The method of claim 1, wherein:

one or more messages previously enqueued in the queue by the publisher have been spilled over to permanent storage.

12. The method of claim 11, wherein the condition is further based on the usage by the publisher of the permanent storage.

13. The method of claim 12, wherein:

the publisher is associated with one or more consumers that consume messages enqueued by the publisher in the queue;

the usage of the queue by the publisher is associated with a first parameter indicating the number of messages enqueued by the publisher that have been consumed by at least one consumer of the one or more consumers;

the usage of the permanent storage by the publisher is associated with a second parameter indicating the number of messages enqueued by the publisher that have been spilled over to the permanent storage; and determining whether the condition is satisfied comprises determining whether the difference between the value of the second parameter and the value of the first parameter exceeds a threshold number of messages.

14. The method of claim 13, further comprising:

defining a separate threshold number of messages for each publisher of the plurality of publishers.

15. The method of claim 11, wherein:

the publisher is associated with one or more consumers that consume messages enqueued by the publisher in the queue; and the method further comprises determining whether to spill over the one or more messages to the permanent storage based on at least one of:

the amount of recovery time configured for the publisher, wherein the recovery time is the maximum period of time allotted upon restart of the publisher for re-creating any messages that were enqueued in the queue before the restart and that have not been consumed by all consumers of the one or more consumers; and the amount of time that any message of the one or more messages has spent in the queue.

16. A non-transitory machine-readable storage medium storing one or more sequences of instructions which, when executed by one or more processors, cause the one or more processors to perform steps comprising:

in response to a publisher attempting to enqueue a message in a queue, determining whether a condition is satisfied;

wherein the publisher is a particular publisher of a plurality of publishers, wherein each publisher of the plurality of publishers enqueues messages in the queue;

wherein the queue is stored in volatile memory;

wherein the condition is based on the usage of the queue by the publisher; and based on whether the condition is satisfied, deciding whether to enqueue the message in the queue, wherein deciding whether to enqueue the message in the queue comprises:

if the condition is satisfied, then restricting the publisher from enqueueing the message in the queue; and if the condition is not satisfied, then allowing the publisher to enqueue the message in the queue.

17. The machine-readable storage medium of claim 16, wherein:
the publisher is associated with one or more consumers, wherein the one or more consumers consume the messages that are enqueued by the publisher in the queue.

18. The machine-readable storage medium of claim 17, wherein the instructions that cause determining whether the condition is satisfied comprise instructions which, when executed by the one or more processors, cause the one or more processors to perform the step of determining whether the number of messages that are not consumed by any consumer of the one or more consumers exceeds a predetermined threshold number of messages that is specified for the publisher.

19. The machine-readable storage medium of claim 18, wherein:
the usage of the queue by the publisher is associated with:
a first parameter indicating the number of messages in the queue that were enqueued by the publisher, and
a second parameter indicating the number of messages that have been consumed by at least one consumer of the one or more consumers; and
the number of messages that are not consumed by any consumer of the one or more consumers is the difference between the value of the first parameter and the value of the second parameter.

20. The machine-readable storage medium of claim 16, wherein the one or more sequences of instructions further comprise instructions which, when executed by the one or more processors, cause the one or more processors to perform the step of determining, for each publisher of the plurality of publishers, whether that publisher is permitted to enqueue messages in the queue based on the usage of the queue by that publisher.

21. The machine-readable storage medium of claim 16, wherein:
the usage of the queue by the publisher is associated with at least one of:
a first parameter indicating the number of messages in the queue that were enqueued by the publisher;
a second parameter indicating the number of messages enqueued by the publisher that have been consumed by at least one consumer of one or more consumers that are associated with the publisher;
a third parameter indicating the size of any message that is enqueued by the publisher in the queue; and
a fourth parameter indicating the amount of volatile memory allocated for the queue; and the condition is based on at least one of the first parameter, the second parameter, the third parameter, and the fourth parameter.

22. The machine-readable storage medium of claim 16, wherein the one or more sequences of instructions further comprise instructions which, when executed by the one or more processors, cause the one or more processors to perform the step of notifying the publisher that the message has not been enqueued in the queue when the condition is satisfied.

23. The machine-readable storage medium of claim 16, wherein:
the condition is a first condition; and
the one or more sequences of instructions further comprise instructions which, when executed by the one or more processors, cause the one or more processors to perform the step of, if the first condition is satisfied, then restricting the publisher from enqueueing any more messages in the queue until a second condition is satisfied.

24. The machine-readable storage medium of claim 23, wherein the second condition is different than the first condition.

25. The machine-readable storage medium of claim 23, wherein the second condition is the same as the first condition.

26. The machine-readable storage medium of claim 16, wherein one or more messages previously enqueued in the queue by the publisher have been spilled over to permanent storage.

27. The machine-readable storage medium of claim 26, wherein the condition is further based on the usage by the publisher of the permanent storage.

28. The machine-readable storage medium of claim 27, wherein:
the publisher is associated with one or more consumers that consume messages enqueued by the publisher in the queue;
the usage of the queue by the publisher is associated with a first parameter indicating the number of messages enqueued by the publisher that have been consumed by at least one consumer of the one or more consumers;
the of the permanent storage by the publisher is associated with a second parameter indicating the number of messages enqueued by the publisher that have been spilled over to the permanent storage; and
the instructions that cause determining whether the condition is satisfied comprise instructions which, when executed by the one or more processors, cause the one or more processors to perform the step of determining whether the difference between the value of the second parameter and the value of the first parameter exceeds a threshold number of messages.

29. The machine-readable storage medium of claim 28, wherein the one or more sequences of instructions further comprise instructions which, when executed by the one or more processors, cause the one or more processors to perform the step of:
defining a separate threshold number of messages for each publisher of the plurality of publishers.

30. The machine-readable storage medium of claim 26, wherein:
the publisher is associated with one or more consumers that consume messages enqueued by the publisher in the queue; and
the one or more sequences of instructions further comprise instructions which, when executed by the one or more processors, cause the one or more processors to perform the step of determining whether to spill over the one or more messages to the permanent storage based on at least one of:
the amount of recovery time configured for the publisher, wherein the recovery time is the maximum period of time allotted upon restart of the publisher for re-creating any messages that were enqueued in the queue before the restart and that have not been consumed by all consumers of the one or more consumers; and
the amount of time that any message of the one or more messages has spent in the queue.

* * * * *

UNITED STATES PATENT AND TRADEMARK OFFICE
CERTIFICATE OF CORRECTION

PATENT NO. : 8,397,244 B2
APPLICATION NO. : 12/835726
DATED : March 12, 2013
INVENTOR(S) : Surlaker et al.

It is certified that error appears in the above-identified patent and that said Letters Patent is hereby corrected as shown below:

In the Specifications

In column 5, line 39-40, delete "("Consumed")" and insert -- ("Consumer1") --, therefor.

In column 5, line 60, delete "enques" and insert -- enqueue --, therefor.

In column 14, line 64, delete "("Consumed")" and insert -- ("Consumer1") --, therefor.

Signed and Sealed this
Fourth Day of June, 2013

Teresa Stanek Rea
*Acting Director of the United States Patent and Trademark Office*